No. 817,555. PATENTED APR. 10, 1906.
R. HARTMANN-KEMPF.
SPEED INDICATOR.
APPLICATION FILED JUNE 27, 1905.
2 SHEETS—SHEET 1.
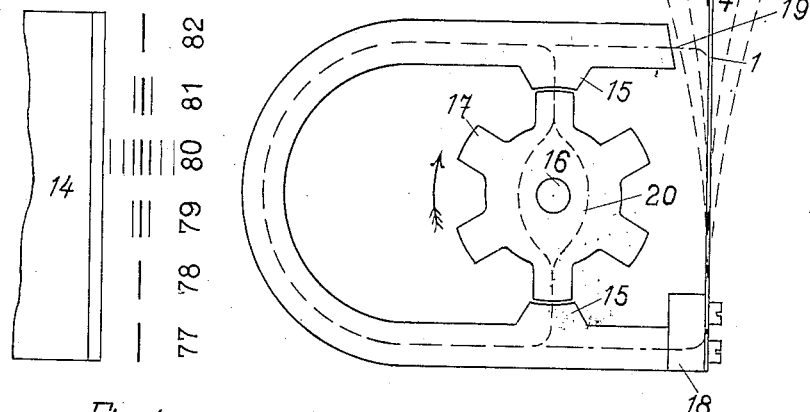
Fig. 4.
Fig. 3.
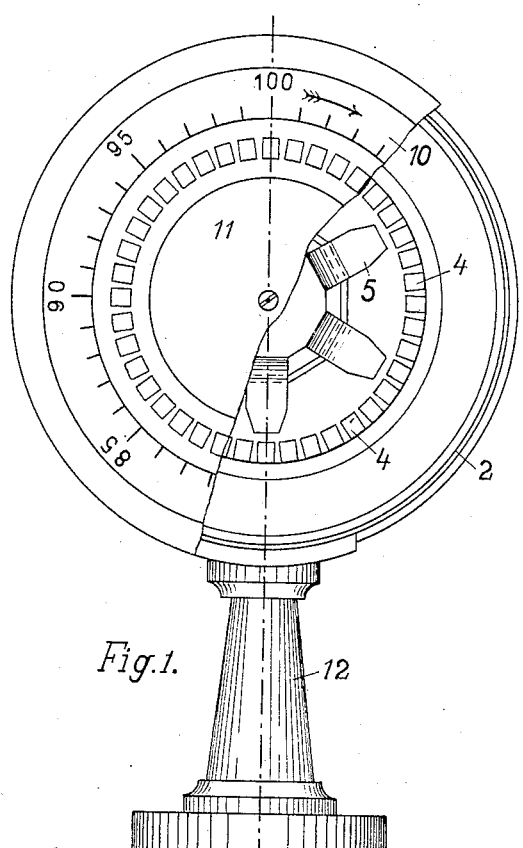
Fig. 1.
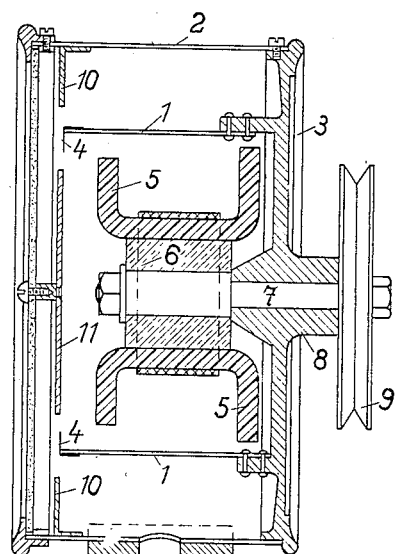
Fig. 2.
Witnesses
Arthur L. Bryant
B. C. Rust
Inventor
Robert Hartmann-Kempf
by Foster, Freeman & Watson
Attorneys No. 817,555. PATENTED APR. 10, 1906.
R. HARTMANN-KEMPF.
SPEED INDICATOR.
APPLICATION FILED JUNE 27, 1905.
2 SHEETS—SHEET 2.
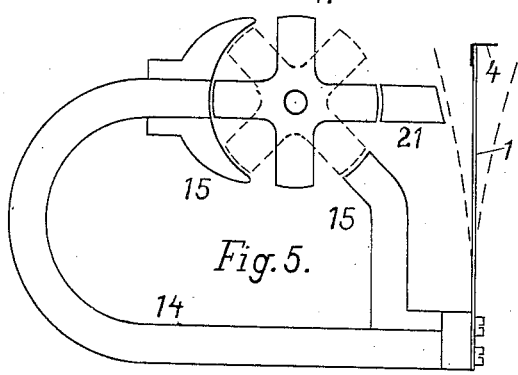
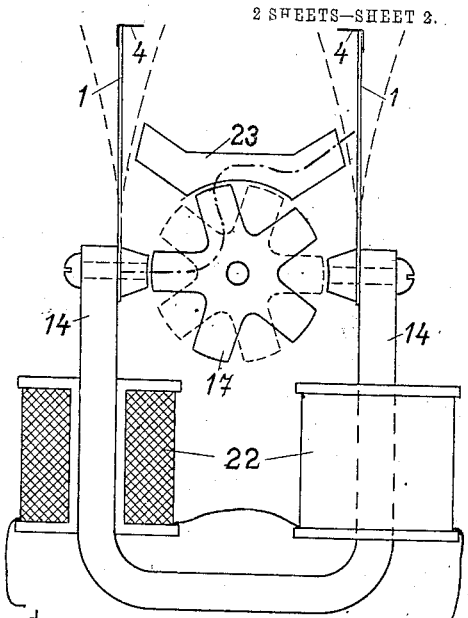
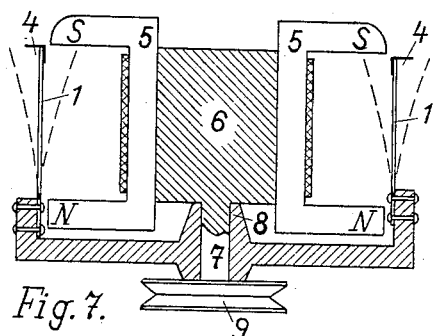
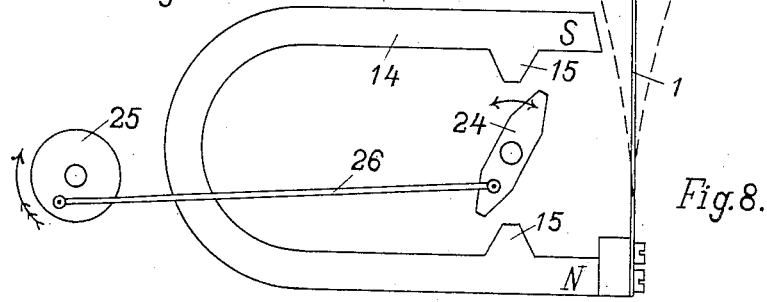
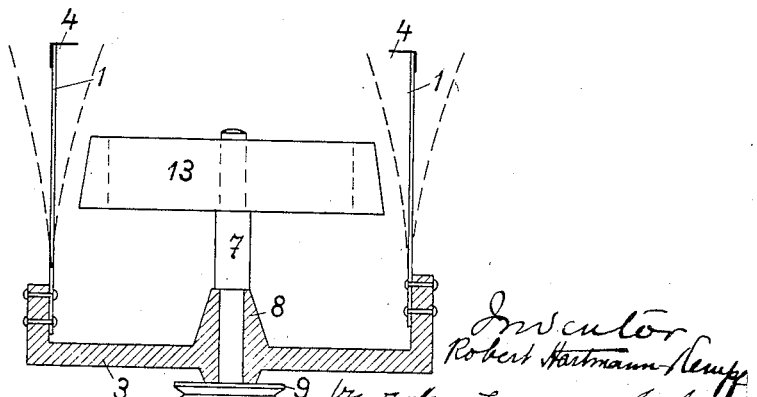
Witnesses
Inventor
Robert Hartmann-Kempf
by Foster, Freeman & Watson
Attorneys.

UNITED STATES PATENT OFFICE.

ROBERT HARTMANN-KEMPF, OF FRANKFORT-ON-THE-MAIN, GERMANY, ASSIGNOR TO THE FIRM OF HARTMANN & BRAUN A. G., OF FRANKFORT-ON-THE-MAIN, GERMANY.

SPEED-INDICATOR.

No. 817,555.           Specification of Letters Patent.           Patented April 10, 1906.

Application filed June 27, 1905. Serial No. 267,243.

*To all whom it may concern:*

Be it known that I, ROBERT HARTMANN-KEMPF, a subject of the German Emperor, residing and having my post-office address at Frankfort-on-the-Main, Germany, have invented certain new and useful Improvements in Speed-Indicators, of which the following is a specification.

This invention relates to an improved instrument for measuring rotational velocities with the aid of the effect produced on resonant bodies by magnetic impulses which succeed each other at a rate corresponding to the velocity to be measured.

An instrument is known in which tongue-like bodies "tuned" according to a suitable scale are used for measuring, by means of their resonance, the frequency of periodic electromagnetic impulses. This known instrument, the action of which is simple and reliable, has been widely adopted in practice, more particularly in cases where it is necessary to measure in laboratories or power-stations the frequency or number of revolutions of existing electric generators which supply alternating currents, and therefore produce electromagnetic impulses. The advantages of the known instrument are, however, less marked in cases in which for the purpose of its use alternating currents must be specially generated by means of small alternators, rotary converters, or the like. In such cases the instrument retains the advantage of being capable of giving the desired indications at a distance, but is in other respects less convenient to use than older instruments which are frequently less accurate.

The object of the present invention is to provide for the purpose indicated an instrument which can in all cases be used without incurring the inconvenience and expense of providing auxiliary apparatus for producing the requisite electromagnetic impulses, the latter being generated by changes in the direction of a magnetic flux—that is to say, by changes in the position or direction of a magnetic field instead of by means of electric currents. This is either effected by rotating a magnetic field or by imparting rotary or oscillatory motion to iron situated in a magnetic field.

The invention is illustrated in the annexed drawings, in which—

Figure 1 is a front view of a speed-indicator or tachometer with a circular scale and a rotary magnetic field, part of the scale and the casing being broken away. Fig. 2 is a vertical cross-section of the instrument shown in Fig. 1. Figs. 3 and 4 are respectively a side view and a partial plan view illustrating means for generating magnetic impulses with the aid of a stationary permanent magnet and a rotatable iron mass. Fig. 5 is a side view illustrating a modification of the arrangement shown in Figs. 3 and 4. Fig. 6 illustrates the arrangement of two sets of resonant bodies in combination with means for generating magnetic impulses with the aid of current-carrying solenoids and an iron mass rotating in the field generated by said solenoids. Fig. 7 is a side view, in partial section, illustrating a modification of the instrument shown in Figs. 1 and 2. Fig. 8 illustrates means for generating magnetic impulses with the aid of a permanent magnet and an oscillating armature, and Fig. 9 illustrates the arrangement of a permanent magnet with a bar-armature adapted to be revolved between resonant bodies.

The instrument shown in Figs. 1 and 2 comprises a series of suitably-tuned steel tongues 1, fixed to a circular flange formed on the back or cover 3 of the casing 2. A small pennant or the like 4 is attached to the free end of each tongue in order to render the vibrations of the latter more easily discernible. Each tongue 1 has of course a definite natural period of vibration, depending upon its length and cross-section; but this period of vibration can, if desired, be adjusted by weighting the free end of the tongue. Any desired number of tongues can be provided. Within the circle formed by the tongues 1 a series of magnets 5 is fixed to a cylinder or drum 6, the latter being fixed to an axle 7, which is provided with a pulley 9 and is supported by a bearing 8, formed in the back or cover 3. In the form of construction illustrated eight U-shaped magnets 5 are provided; but any other number of magnets of other suitable shape can, if desired, be used. Generally speaking, a comparatively large number of magnets is used if the speed of rotation is low. For high speeds fewer magnets are required. The free ends of the tongues 1, with the pennants 4 attached thereto, are surrounded by an annular scale 10 and surround a disk 11, situated in the same plane as the latter. The scale 10 and disk 11 are provided with numerals which indicate either the numbers of vibrations performed per second by the various tongues 1 or certain values proportional to these numbers—for instance, the corresponding numbers of revolutions per minute made by the driving-shaft or the periodicity of an alternator with which the tachometer is connected. The instrument is provided with a foot or pedestal 12, by means of which it can be placed on a table or fixed to a wall, ceiling, or the like.

The action of the tachometer is as follows: During the rotation of the magnets 5 a slight force of attraction is intermittently exerted on the tongues 1 by reason of the successive approach and removal of the magnets. Each of the tongues is thus caused to vibrate through a small arc. If the magnetic field—that is to say, the series of eight magnets—makes ten revolutions per second, each of the tongues will be attracted eighty times per second. The vibration due to this action will be barely perceptible, except in the case of a tongue the natural period of vibration of which is one-eightieth of a second. With such a tongue, however, the effect of resonance will cause vibrations through a large arc to take place, while tongues which have longer or shorter periods of vibration and are adapted to perform, say, seventy-eight or eighty-two vibrations per second, will not receive any readily perceptible motion. If, however, the difference between the periodicity of the attractions and the natural rate of vibration of a tongue is very small and is represented, for instance, by half a vibration or one vibration per second, smaller, but nevertheless distinctly perceptible, oscillation of the respective tongue will take place, so that fractional values can be ascertained. The scale is calibrated by applying to the parts opposite vibrating tongues numerals depending on the constant of the instrument—that is to say, on the number of magnets, diameter of the pulley, and so on.

Instead of arranging the magnets in such a manner that they are entirely within the circle formed by the tongues 1, as shown in Figs. 1 and 2, the arrangement can be such that one pole of each magnet lies outside the plane in which the free ends of the tongues are situated, as shown in Fig. 7. In this case the effect produced by the rotation of the magnetic field is considerably more powerful, and the vibration of the tongues can be freely observed notwithstanding the position of the outer magnet-poles, since according to known mathematical principles the nearest approach of the vibrating tongue toward the attracting magnet-pole does not take place when the attracting-pole is opposite the said tongue, but half a period later. The tongue vibrating under the effect of resonance therefore swings into the space between two successive magnets. This affords a further means for ascertaining or recognizing whether complete or only partial resonance is established, since in the latter case the inward swing of the tongue will be partly or entirely concealed by the rotating magnets, only the outward swing being visible in its entirety.

Instead of using a series of U-shaped magnets 5, a single rotary bar-magnet 13 can be used in the manner illustrated in Fig. 9, a circular scale being provided in this case also. The axle 7 of the magnet 13 is arranged in a bearing 8 in the bottom or back 3 of the casing, and the said axle is adapted to be driven by means of a suitable pulley or the like, so that the magnet 13 is revolved within the circle formed by a series of tongues 1. The action is the same as that described with reference to Figs. 1, 2, and 7.

As has already been mentioned, the requisite magnetic impulses can also be generated by imparting rotary or oscillatory motion to a body of iron situated within a stationary magnetic field. By this means periodic changes in the direction of the flux are produced, and those portions of the field in which the resonant bodies—that is to say, the tongues 1—are situated are alternately strengthened and weakened, so that an intermittent or periodic pull is exerted on the tongues. Figs. 3 and 4 illustrate an arrangement for generating magnetic impulses in this manner. The mechanism used for the purpose is adapted to be inclosed in a suitable casing (not illustrated) and comprises a permanent horseshoe-magnet 14, provided near its ends with pole-pieces 15. Between the latter is situated an axle 16, mounted in a suitable bearing and directly or indirectly connected with the shaft the velocity of which is to be measured. A bar 18 is fixed to the lower arm of the magnet, and a plurality of tongues 1 are screwed side by side to the said bar, the magnet being for this purpose of suitable width. The free ends of the said tongues are provided with small plates, pennants, or the like 4 and are situated between two scale-plates, which are preferably fixed to the casing at suitable distances from the tongues, but in the same plane as the free ends of the latter. Owing to the arrangement described, the magnetic circuit is divided into two main branches 19 and 20, the branch 19 being formed by the steel tongues 1 and the branch 20 by the iron drum-armature 17, fixed to the axle 16. When two horns of the said armature are in line with the pole-pieces 15, the magnetic flux is practically short-circuited by the armature and only a small number of lines of force passes through the tongues 1. If, however, no armature-horns are in line with the pole-pieces, comparatively large air-gaps exist between the pole-pieces and the armature, so that most of the lines of force pass through the tongues 1, and the latter are thus more powerfully attracted than they were before. If, for example, the axle 16 is rotated at such a speed that the flux is short-circuited by the armature one hundred times a second, one hundred separate impulses will act during that period on the tongues 1, and the tongue which is tuned to make one hundred vibrations per second will be subjected to the effects of resonance and will oscillate in a plainly visible manner, whereas no perceptible vibration will be imparted to the other tongues. The external field is thus alternately weakened and strengthened with a frequency corresponding to the velocity of the axle 17, and the effect is exactly similar to that of the field due to an alternating electric current. The constant of the instrument depends on the number of armature-horns and on the ratio between the driving and driven pulleys.

The form of construction illustrated in Figs. 3 and 4 is more particularly adapted for use in connection with a straight or curved scale. A modification of this form of construction is shown in Fig. 5. In this modification a cross-shaped armature 17 is adapted to be rotated between the two pole-pieces 15 of a permanent magnet 14, and a short bar or iron path 21 is arranged between the armature and the steel tongues 1. When the armature is in the position indicated in Fig. 5 by dotted lines, the bar 21 and tongues 1 are short-circuited as regards magnetic flux; but when the armature occupies the position indicated by solid lines lines of force pass through the bar 21 to the tongues 1 and the latter are attracted. The action is the same as described with reference to Figs. 3 and 4.

In the form of construction shown in Fig. 6 the steel tongues 1 are for economy of space arranged side by side in two parallel rows, between which an armature 17 is adapted to be revolved in the stationary magnetic field due to a magnet 14. The latter is not a permanent magnet, but is adapted to be excited by means of two coils 22, fed with continuous current. A stationary armature 23 is arranged above the armature 17 between the two rows of tongues. When the rotary armature 17 is in the position indicated by solid lines, the external path of the lines of force is substantially as indicated by the curved dotted line which passes from the pole-piece 15 through two horns of the rotary armature to the stationary armature and thence to the steel tongues on the right-hand side of the instrument. Some lines of force are of course lost by leakage; but the number of lines which passes through the tongues on the left-hand side of the instrument when the armature 17 is in the position referred to is infinitesimal as compared with the number which passes through the armature 17. The conditions are, however, reversed when the armature 17 has been rotated through thirty-six degrees into the position indicated by dotted lines. Then most of the lines of force pass through the tongues on the left-hand side of the instrument, and practically no attraction is exerted on the tongues on the right-hand side. The rotation of the armature 17 therefore produces, as it were, an oscillation of the lines of force, so that the lateral parts of the field in which the tongues are situated are alternately strengthened and weakened, and the tongue in connection with which resonance is established is caused to vibrate in a readily-perceptible manner.

Fig. 8 illustrates a form of construction in which the magnetic impulses are produced by means of an iron body oscillating in a magnetic field instead of by means of a revolving body. The iron body or armature 24 is supported by means of an axle 16 between the pole-pieces 15 of a permanent magnet 14. A connecting-rod 25 is eccentrically pivoted to a disk 25 and to the armature 24 in such a manner that the latter is rapidly oscillated when the said disk is revolved by means of the shaft the speed of which is to be measured. By the oscillation of the armature the external field, in which a series of steel tongues 1 is situated, is alternately weakened and strengthened, the action being in this respect similar to that described with reference to the other forms of construction illustrated. The form of construction shown in Fig. 8 is more particularly adapted for measuring very high velocities.

The mechanical advantages of the instrument described may be summed up as follows: The operative parts are not subjected to wear and tear by which the accuracy of the measurements is affected. The amount of power absorbed for producing the vibration of the resonant bodies is very small, since the action of the instrument does not involve the alternate generation and destruction of a magnetic field, but only the displacement of lines of force, so that losses due to hysteresis and remanence are avoided. The slip incurred in the working of the instrument is therefore practically negligible and is much smaller than that which occurs in most of the tachometers or speed-indicators hitherto known, which require more power to drive them. The axle of the improved speed-indicator described can be revolved by means of a thin driving-cord or even by means of a twisted cord acting as a flexible shaft, the latter arrangement being more particularly suitable when the transmission has to take place round corners or the like.

If a suitable number of rotary magnets or armature-horns is provided or a suitable train of gear-wheels, the instrument can be directly applied to the shaft the velocity of which is to be measured. This is of special advantage for ascertaining the slip in asynchronous motors.

What I claim as my invention, and desire to secure by Letters Patent of the United States, is—

1. In a speed-indicator the combination of a graduated scale, means for producing a continuous magnetic field, resonant bodies of magnetic material situated in said field and tuned to correspond with said scale, and means for displacing the lines of force of said field for the purpose of imparting periodic magnetic impulses to said resonant bodies.

2. In a speed-indicator the combination of a graduated scale, means for producing a continuous magnetic field, resonant bodies of magnetic material situated in said field and tuned to correspond with said scale, means for displacing the lines of force of said field for the purpose of imparting periodic magnetic impulses to said resonant bodies and means for indicating the vibration of said resonant bodies.

3. In a speed-indicator, the combination with means for producing a magnetic field, of tuned resonant bodies of magnetic material situated in said field, and means for changing the lines of force of said field in proportion to the speed measured.

4. In a speed-indicator, the combination with means for producing a magnetic field, of tuned resonant bodies of magnetic material situated in said field, movable devices situated within said field for changing the lines of force thereof, and means for moving said bodies in proportion to the speed measured.

In testimony whereof I have signed my name to this specification in the presence of two subscribing witnesses.

ROBERT HARTMANN-KEMPF.

Witnesses:
    JEAN GRUND,
    MICHAEL VOLK.